United States Patent [19]

Koike

[11] Patent Number: 4,622,561
[45] Date of Patent: Nov. 11, 1986

[54] IMAGE FORMING METHOD FOR DOT MATRIX PRINTER

[75] Inventor: Takahisa Koike, Tokyo, Japan

[73] Assignee: Ricoh Company, Ltd., Tokyo, Japan

[21] Appl. No.: 720,273

[22] Filed: Apr. 5, 1985

[30] Foreign Application Priority Data

Apr. 10, 1984 [JP] Japan .................................. 59-71489
Apr. 10, 1984 [JP] Japan .................................. 59-71490

[51] Int. Cl.⁴ .......................... G01D 15/18; H04N 1/23
[52] U.S. Cl. ...................................... 346/1.1; 346/75; 358/296
[58] Field of Search ................... 346/1.1, 75; 358/296, 358/300

[56] References Cited

U.S. PATENT DOCUMENTS 4,272,771 6/1981 Furukawa ............................ 346/75
4,408,868 10/1983 Thomas et al. ................. 358/300 X Primary Examiner—George H. Miller, Jr.
Attorney, Agent, or Firm—Oblon, Fisher, Spivak, McClelland & Maier

[57] ABSTRACT

An image forming method for a color dot matrix printer prevents image quality from being deteriorated at the boundary between two nearby image areas which are developed by consecutive main scans. A paper is fed in a subscan direction by an amount which is one half of the width of a plurality of deflection steps, which is covered by one main scan, thereby developing an overlapping print area. The overlapping print area is subdivided at desired one of the deflection steps either column by column or color by color, an image segment in each of the resulting subregions being printed out by one of consecutive main scans.

4 Claims, 10 Drawing Figures

IMAGE FORMING METHOD FOR DOT MATRIX PRINTER

BACKGROUND OF THE INVENTION

The present invention relates to a method of forming a complete image by combining a plurality of image segments and, more particularly, to an image forming method capable of eliminating deterioration of image quality inherent in a serial scan color ink jet printer or like color dot matrix printer, i.e. deterioration at a boundary portion between two nearby image segments which are provided by consecutive main scans.

In a dot matrix printer, it has been customary to produce images on a paper by moving a carriage a plurality of times in a main scan direction while feeding the paper in a subscan direction between consecutive main scans. The problem encountered with such a printer is that the quality of images is apt to be deteriorated at the broundary or joining portion between two nearby image segments printed out by two consecutive main scans due to irregular paper feed, vibration of the carriage and, in a charge control ink jet printer, irregular deflection.

SUMMARY OF THE INVENTION

It is therefore an object of the present invention to provide an image forming method for a dot matrix printer which makes deterioration of an image at a joining portion between nearby image segments unnoticeable by scattering such joining portions over completed images.

It is another object of the present invention to provide a generally improved image forming method.

An image forming method of the present invention is applicable to a dot matrix printer which prints out dots in a recording medium over a plurality of steps in a subscan direction by moving recording heads in a main scan direction relative to the recording medium and, every time a main scan completes, feeds the recording medium in the subscan direction relative to the recording heads. The image forming method comprises the steps of providing mutually overlapping print areas during at least two consecutive main scans by selecting an amount of feed of the recording medium in the subscan direction which is smaller than a width of a plurality of print lines, which comprises a plurality of steps, to be recorded by one main scan, subdividing an overlapping region of the print areas into a plurality of subregions, and determining by which one of main scans performed by the recording heads each of the subregions should be printed out. This frees a boundary portion between the nearby print areas each being provided by a main scan from deterioration of image quality.

In accordance with the present invention, an image forming method for a color dot matrix printer prevents image quality from being deteriorated at the boundary between two nearby image areas which are developed by consecutive main scans. A paper is fed in a subscan direction by an amount which is one half of the width of a plurality of deflection steps, which is covered by one main scan, thereby developing an overlapping print area. The overlapping print area is subdivided at desired one of the deflection steps either column by column or color by color, an image segment in each of the resulting subregions being printed out by one of consecutive main scans.

The above and other objects, features and advantages of the present invention will become apparent from the following detailed description taken with the accompanying drawings.

DESCRIPTION OF THE PREFERRED EMBODIMENTS

While the image forming method of the present invention is susceptible of numerous physical embodiments, depending upon the environment and requirements of use, substantial numbers of the herein shown and described embodiments have been made, tested and used, and all have performed in an eminently satisfactory manner.

Figure 1:
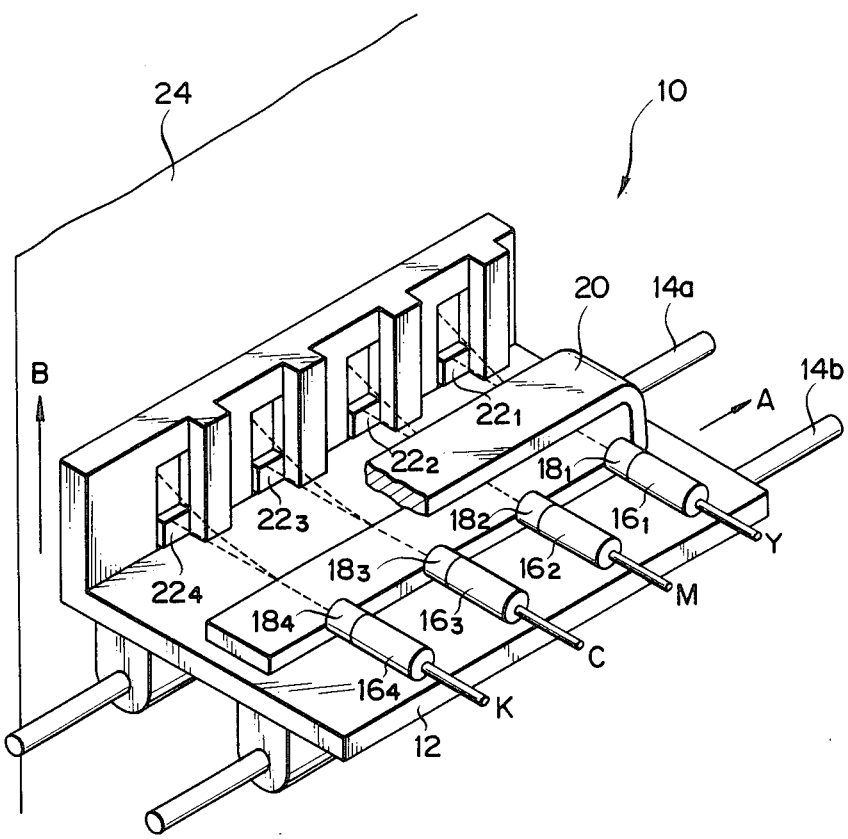
FIG. 1 is an perspective external view of a prior art color dot ink jet printer.

Referring to FIG. 1 of the drawings, a charge control color ink jet printer which is of the type well known in the art is shown and generally designated by the reference numeral 10. The printer 10 comprises a carriage 12, parallel carriage guide rods 14a and 14b, four ink jet heads $16_1$, $16_2$, $16_3$ and $16_4$, charging electrodes $18_1$, $18_2$, $18_3$ and $18_4$, a deflection electrode 20, and gutters $22_1$, $22_2$, $22_3$ and $22_4$. The heads $16_1$, $16_2$, $16_3$ and $16_4$ are supplied with yellow ink (Y), magenta ink (M), cyan ink (C) and black ink (K), respectively. As well known in the art, the carriage 12 is moved in a main scan direction as indicated by an arrow A, while the ink in different colors is ejected from the associated heads $16_1$, $16_2$, $16_3$ and $16_4$, thereby printing out multi-color images on a paper 24. The paper 24 is fed in a subscan direction as indicated by an arrow B every time a main scan by the heads is completed.

Figure 2:
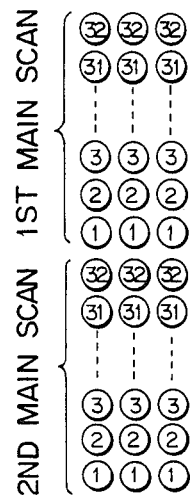
FIGS. 2 and 3 show a prior art image forming method practiced with the printer shown in FIG. 1.
Figure 3:
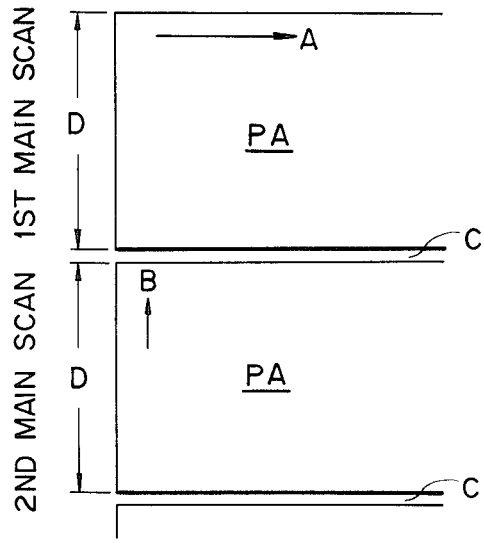

FIG. 2 shows positions of ink dots printed out on the paper 24 by the color ink jet printer 10 of FIG. 1 which in this particular example is assumed to deflect ink drops over thirty-two consecutive steps. The main scan direction A and the subscan direction, or paper feed direction, B are related with print areas PA as shown in FIG. 3. As shown, in a prior art printer of the type described, the paper 24 is fed in the subscan direction B by each deflection width D (difference between the highest and lowest deflection steps) every time the scanning movement of the carriage 12 in the main scan direction A is completed, thereby producing complete images on the paper 24. This kind of image forming procedure, however, brings about deterioration of image quality because the space between nearby image segments formed by consecutive scans, i.e., a boundary or joining portion C between the nearby print areas PA shown in FIG. 3, appear conspicuos on the paper 24.

Figure 4:
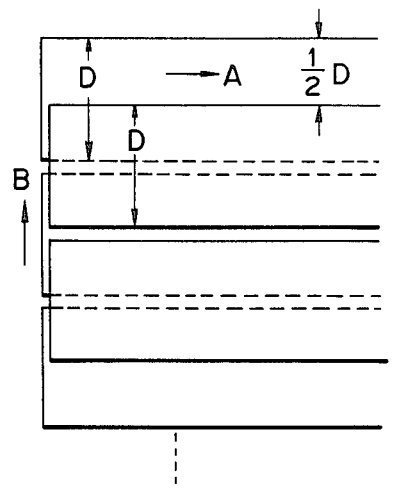
FIG. 4 shows the principles of an image forming method for a color dot ink jet printer in accordance with the present invention.
Figure 5:
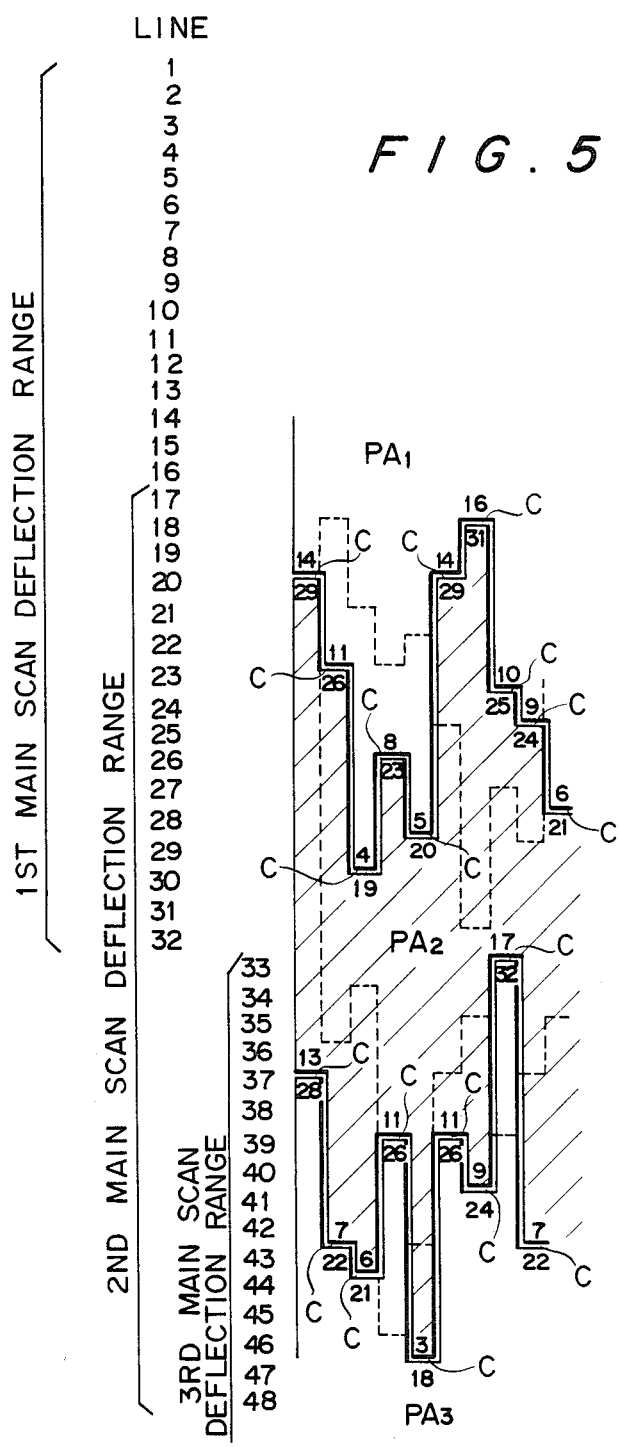
FIG. 5 shows a preferred embodiment of the image forming method of the present invention.

Referring to FIG. 4, there is shown the principles of an image forming method in accordance with the present invention which is free from the problem discussed above. Specifically, in accordance with one embodiment of the present invention, paper feed in the subscan direction B is effected over one half of the conventional distance each time, i.e. one half of the total deflection width D in the main scan direction. For example, for the sixteen deflection steps which is one half the thirty-two deflection steps, an image segment is prined out by two consecutive main scans in an overlapping manner. That is, as shown in FIG. 5, in the overalpping portion the sixteen steps are subdivided into two groups at a suitable step so that image data in the upper group may be printed out by the first scan and the lower group by the second scan. In this instance, the specific step at which the sixteen steps are subdivided is changed column by column so that such steps for subdivision are scattered and not aligned. Further, it is changed color by color as well. In detail, in FIG. 5, $PA_1$ designates a print area assigned to the first scan, $PA_2$ a print area assigned to the second scan, and $PA_3$ a print area assinged to the third scan; the numerals in the vicinity of each joining portion C between nearby print areas indicate deflection steps in the respective columns associated with the main scans, while phantom lines represent color-by-color subdivision.

Figure 6:
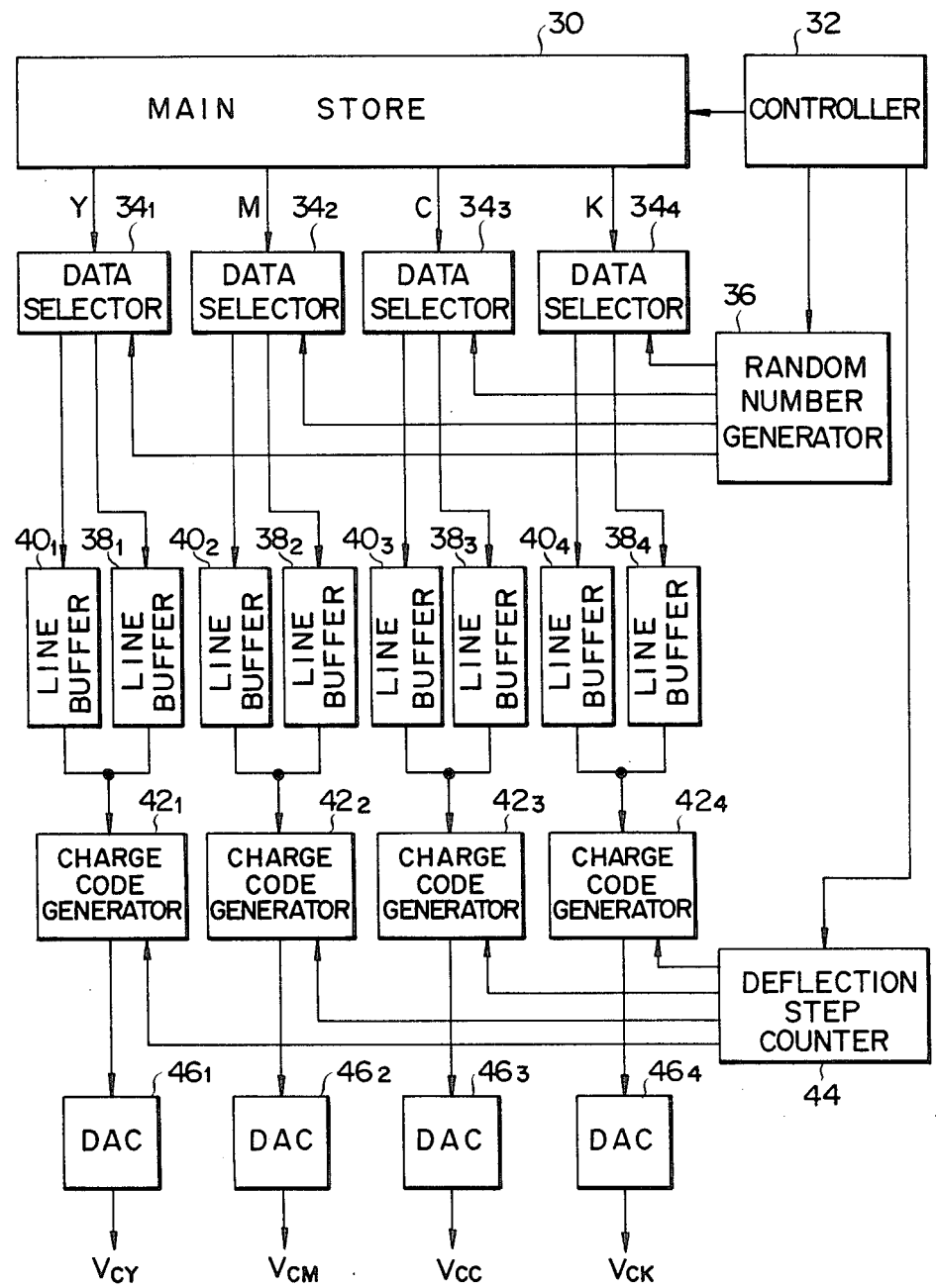
FIG. 6 is a block diagram of an electrical arrangement with which the method shown in FIG. 5 may be implemented.

Referring to FIG. 6, there is shown an electrical arrangement of an apparatus with which the above-described method of the present invention may be practiced. The arrangement includes a main store 30, a controller 32, data selectors $34_1$, $34_2$, $34_3$ and $34_4$, a random number generator 36, line buffers $38_1$, $38_2$, $38_3$, $38_4$, $40_1$, $40_2$, $40_3$ and $40_4$, charge code generators $42_1$, $42_2$, $42_3$ and $42_4$, a deflection step counter 44, and digital-to-analog converters (DAC) $46_1$, $46_2$, $46_3$ and $46_4$. Labeled Y is a data signal representative of yellow images, M a data signal representative of cyan images, and K a data signal representative of black images, while labeled $V_{CY}$, $V_{CM}$, $V_{CC}$ and $V_{CK}$ respectively are charging voltages associated with yellow images, magenta images, cyan images, and black images.

The main store 30 is adapted to store image data which are to be printed out. The image data are read out of the main store 30 by an amount corresponding to one main scan at a time and, then, distributed to the line buffers $38_1$–$38_4$ or $40_1$–$40_4$ in esponse to outputs of the random number generator 36. At the same time, by which one of the nearby main scans the data in the overlapping sixteen steps should be printed out is determined as spcified by the random number generator 36. For example, in the leftmost column in FIG. 5, data associated with lines nos. 20–32 are transferred to the line buffers $38_1$–$38_4$ by the first data transfer and, thereafter, the contents of the line buffers $38_1$–$38_4$ are printed out. By the second data transfer, the data associated with the lines nos. 33–36 are transferred to the line buffers $40_1$–$40_4$ and those associated with the lines nos. 37–38 to the line buffers $38_1$–$38_4$, followed by printing out the contents of the line buffers $40_1$–$40_4$. Thereafter, the same sequence of events is repeated.

In response to the data fed from the line buffers $38_1$–$38_4$ and $40_1$–$40_4$, the charge code generators $42_1$–$42_4$ each generate a charge code corresponding to a particular step designated by the deflection step counter 44. The charge code ouput from each of the charge code generators $42_1$–$42_4$ is converted by a charging voltage by the associated DAC $46_1$, $46_2$, $46_3$ and $46_4$.

While the procedure has been described above with respect to the leftmost column in FIG. 5, for the other columns from second to the last the points of subdivision in data transfer are determined by other random numbers.

As mentioned earlier, the phantom lines in FIG. 5 represent exemplary subdivision on a color-by-color basis. Changing the point of subdivision from one to another of all the four colors as illustrated will further conceal the joining portions between nearby lines in completed images.

Figure 7:
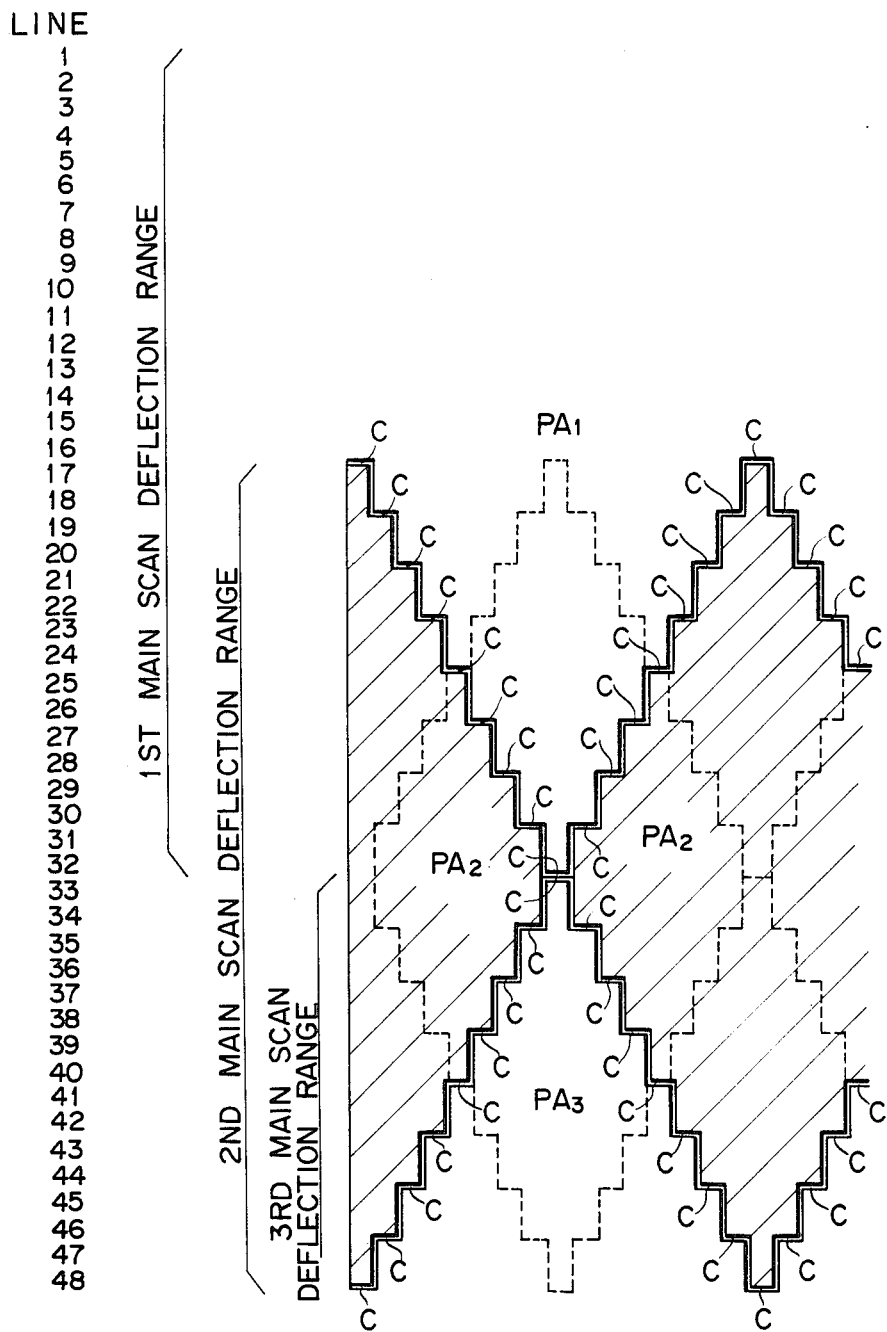
FIG. 7 shows another embodiment of the image forming method of the present invention.

Referring to FIG. 7, another embodiment of the present invention is shown in which the the points of subdivision in the respective columns are selected employing a certain pattern which prevents the jointing portions C from showing themselves, instead of the random numbers. In FIG. 7, labeled $PA_1$ is a print area assigned to the first main scan, $PA_2$ a print area assigned to the second main scan, and $PA_3$ a print area assigned to the third main scan. In this particular embodiment, the selected pattern of subdivision points is such that the subdivision regularly changes by every two steps column by column. Such develops a joining portion C which appears generally aslant and will not be conspicuous in recorded images. To further enhance this effect, the point of subdivision may be changed column by column on a color basis.

While the present invention has been shown and described in relation to a color ink jet printer, it is of course applicable to a monochromatic ink jet printer, in which case all the images will be printed out in black.

Figure 8:
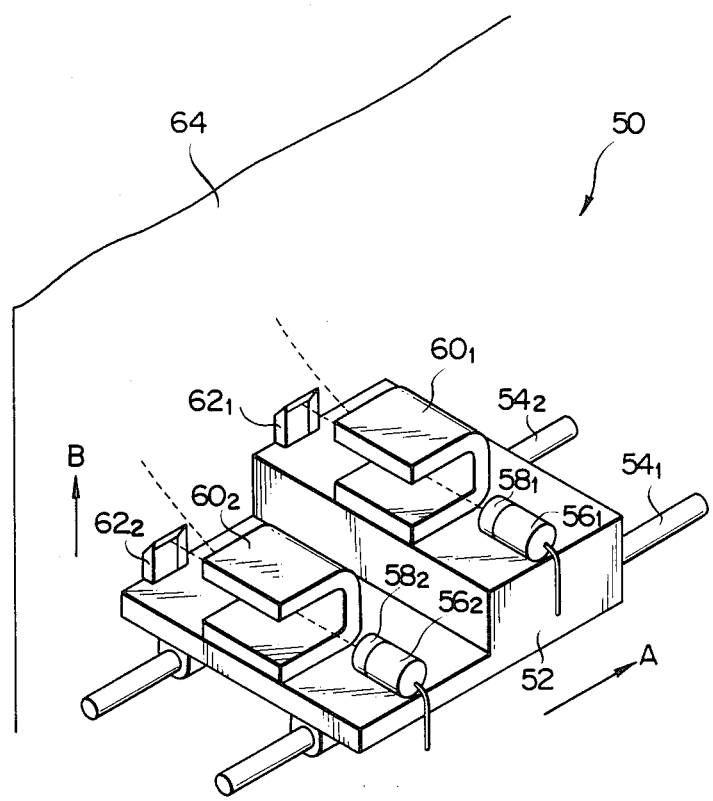
FIG. 8 is a perspective external view of another prior art link jet printer to which the present invention is applicable.

Referring to FIG. 8, another prior art ink jet printer to which the present invention is applicable is shown. The printer, generally 50, comprises a carriage 52, parallel carriage guide rods $54_1$ and $54_2$, ink jet heads $56_1$ and $56_2$, charging electrodes $58_1$ and $58_2$, deflection electrodes $60_1$ and $60_2$, and gutters $62_1$ and $62_2$. In this particular example, the two heads $56_1$ and $56_2$ are mounted on the carriage 52 at different levels. the carriage 52 is moved in the main scan direction as indicated by an arrow A, while a paper 64 is fed in the subscan direction as indicated by an arrow B every time the carriage 52 completes a main scan, with the result that images are printed out on the paper 64.

Figure 9:
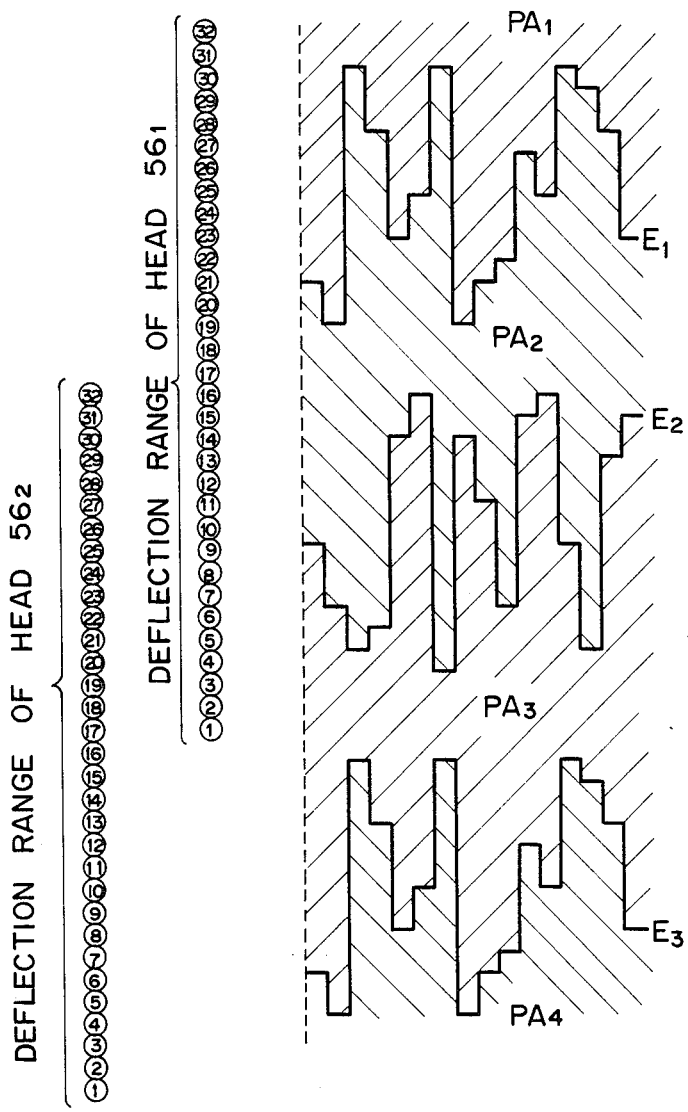
FIG. 9 represents an example of image forming procedures which may be implemented by the printer of FIG. 8.

The printer shown in FIG. 8 may be constructed to printed out data as shown in FIG. 9 by way of example. In FIG. 9, there are shown a print area $PA_1$ provided by the head $56_2$ during the last main scan, a print area $PA_2$ provided by the head $56_1$ during the current main scan, a print area $PA_3$ provided by the head $56_2$ during the current main scan, a print area $PA_4$ to be provided by the head $56_1$ during the next main scan, a division $E_1$ between the print area provided by the head $56_1$ during the current main scan and the print area provided by the head $56_2$ during the last main scan, a divsion $E_2$ between the print areas provided by the heads $56_1$ and $56_2$ during the current main scan, and a division $E_3$ between the print area provided by the head during the current main scan $56_2$ and the print area to be provided by the head $56_1$ during the next main scan. In the printer 50, therefore, the heads $56_1$ and $56_2$ cover individual print areas which overlap each other over one half of the thirty-two deflection steps, i.e. sixteen deflection steps, as shown in FIG. 9; one main scan covers forty-eight steps in total, i.e. 32+32−16=48.

The printer 50, therefore, develops joining portions between image segments formed by the two heads $56_1$ and $56_2$ and between image segments formed by two consecutive main scans, with the result that the image quality is deteriorated at such multiple joining portions.

Another embodiment of the present invention, which will be described, is successful in making the joints mentioning portions mentioned above unnoticeable and, thereby, improving the quality over the whole images. Specifically, it conceals the joining portions between images segments provided by the two vertically staggered heads by varying the point of subdivision randomly among the sixteen overlapping deflection steps, while concealing the joining portions between the image segments produced by two consecutive main scans by varying the point of subdivision randomly among upper sixteen of the deflection steps of the head $56_2$ and lower sixteen of the deflection steps of the head $56_2$ used in the last main scan. In this instant, it is necessary that the subdivision pattern assigned to the lower sixteen steps of the head $56_2$ during a given main scan be alighed with the that assigned to the upper sixteen steps of the head $56_1$ during the next main scan.

Figure 10:
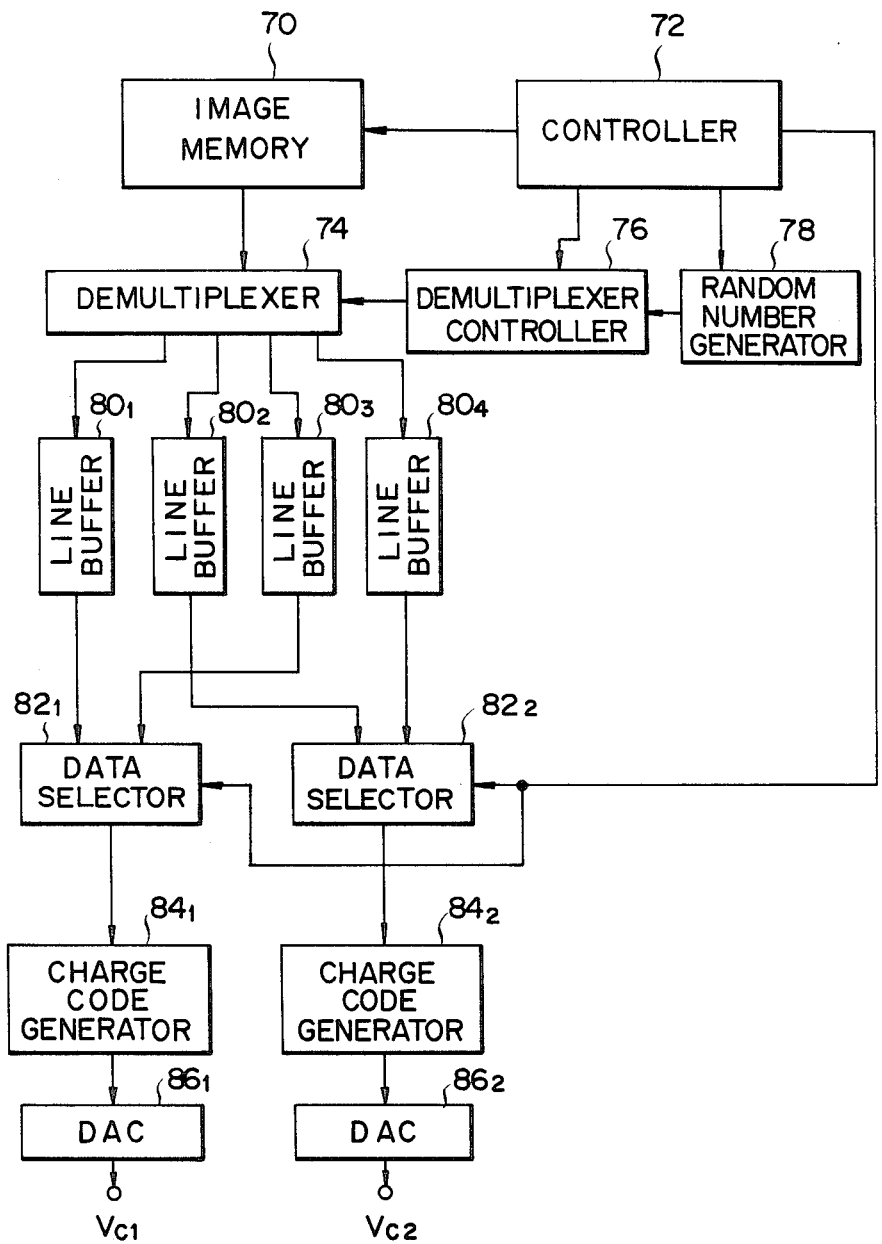
FIG. 10 is a block diagram of an electrical arrangement with which the method of FIG. 8 may be practiced.

Referring to FIG. 10, an electric circuit for practicing the method in accordance with the second embodiment stated above is shown. The circuit includes an image store 70, a controller 72, a demultiplexer 74, a demultiplexer controller 76, a random number generator 78, line buffers $80_1$-$80_4$, data selectors $82_1$ and $82_2$, charge code generators $84_1$ and $84_2$, and DACs $86_1$ and $86_2$. A charging signal $VC_1$ is applied to the charging electrode $58_1$, and a charging signal $VC_2$ to the other charging electrode $58_2$.

The image memory 70 functions to store data to be printed out. Instructed by the controller 72, the image memory 70 delivers the data in a dot matrix to the demultiplexer 74 which then distributes the data to the line buffers $80_1$-$80_4$. Meanwhile, the demultiplexer controller 76 which is controlled by an output of the random number generator 78 controls the selection of outputs of the demultiplexer 74. The distribution of data to the line buffers $80_1$-$80_4$ and data printout will proceed in the following sequence.

By the first data transfer, data associated with the first to sixteenth deflection steps in the print area PA, assigned to the head $56_1$ as shown in FIG. 9 are transferred to the line buffer $80_1$, and data associated with the print area $PA_3$ assigned to the head $56_2$ to the line buffer $80_2$, and the data associated with the print area $PA_4$ above the seventeenth deflection step for the next main scan to the line buffer $80_3$. The procedure described so far completes the transfer of thirty-two steps of data shown in FIG. 9. Thereafter, the head $56_1$ prints out the data stored in the line buffer $80_1$, and the head $56_2$ the data stored in the line buffer $80_2$. During the subsequent data transfer, the first to sixteenth steps of data in the print area $PA_2$ are delivered to the line buffer $80_3$, the data in the print area $PA_3$ to the line buffer $80_4$, and the seventh to thirty-second of data to be printed out by the head $56_1$ during the next main scan to the line buffer $80_1$. Then, the head $56_1$ will print out the content of the line buffer $80_3$ and the head $56_2$, the content of the line buffer $80_4$. Such a sequence of events will be repeated thereafter.

Although the foregoing description of the present invention has focused to a charge deflection ink jet printer having thirty-two deflection steps, such is only illustrative. That is, the present invention is applicable even to a drop-on-demand ink jet printer, a partial ink jet printer, a wire dot printer, a thermal printer and others only if the charge code generators, DACs and like circuit elements are modified accordingly.

Further, while the present invention has been shown and described in relation to a scan type ink jet printer, it generally finds various other applications in which a plurality of image segments are combined to provide a single complete image. In any case, the principles of the present invention are achievable by entangling boundary portions between image segments using small units.

In summary, it will be seen that the present invention provides an image forming method which conceals boundary or joining portions developing between image segments and, particularly in a scan type ink jet printer or the like, scatters the joining portions between consecutive scans over the whole deflection steps. This is effective to prevent the joining portions from appearing conspicuous despite irregular paper feed or irregular deflection. The unnoticeable joining may be further enhanced by varying the pattern of joining portions column by column.

Various modifications will become possible for those skilled in the art after receiving the teachings of the present disclosure without departing from the scope thereof.

What is claimed is:

1. An image forming method for a ink jet printer which prints out dots in a recording medium over a plurality of steps in a subscan direction by moving recording head means in a main scan direction relative to the recording medium and, every time a main scan completes, feeds the recording medium in the subscan direction relative to the recording head means, said image forming method comprising the steps of:
   (a) providing mutually overlapping print areas during at least two consecutive main scans by selecting an amount of feed which is one half the width of the print line of the recording medim in the subscan direction;
   (b) subdividing an overlapping region of the print areas into a plurality of subregions; and
   (c) determining by which one of main scans performed by the recording head means each of the subregions should be printed out;
   whereby a boundary portion between the nearby print areas each being provided by a main scan is free from deterioration of image quality.

2. An image forming method as claimed in claim 1, wherein step (b) comprises (d) subdividing the overlapping region of the print areas column by column at a predetermined step.

3. An image forming method as claimed in claim 2, wherein step (d) comprises (e) randomly selecting the predetermined step column by column.

4. An image forming method as claimed in claim 2, wherein step (d) comprises (e) selecting the predetermined step such that the overlapping portion of the print areas includes a predetermined pattern defined by boundary portions of the respective columns which originate from the dubdivision.

* * * * *